(12) United States Patent
Higuchi

(10) Patent No.: US 8,157,945 B2
(45) Date of Patent: Apr. 17, 2012

(54) THIN PLATE GLASS LAMINATE, PROCESS FOR PRODUCING DISPLAY DEVICE USING THIN PLATE GLASS LAMINATE, AND SUPPORT GLASS SUBSTRATE

(75) Inventor: Toshihiko Higuchi, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 569 days.

(21) Appl. No.: 12/267,029

(22) Filed: Nov. 7, 2008

(65) Prior Publication Data

US 2009/0110882 A1 Apr. 30, 2009

Related U.S. Application Data

(63) Continuation of application No. PCT/JP2007/058655, filed on Apr. 20, 2007.

(30) Foreign Application Priority Data

May 8, 2006 (JP) .................................. 2006-129282

(51) Int. Cl.
*B29C 65/00* (2006.01)
*B32B 37/00* (2006.01)
*B32B 9/04* (2006.01)
*B32B 33/00* (2006.01)

(52) U.S. Cl. ........ 156/247; 156/278; 428/41.8; 428/447

(58) Field of Classification Search .................. 156/145, 156/147, 247, 278, 307.1, 307.3, 307.5; 428/447, 428/40.1, 41.7, 41.8
See application file for complete search history.

(56) References Cited

U.S. PATENT DOCUMENTS

| 5,985,396 A * | 11/1999 | Kerins et al. ................. 428/41.8 |
| 6,287,674 B1 * | 9/2001 | Verlinden et al. ............. 428/210 |
| 2003/0121601 A1 | 7/2003 | Tajima |
| 2008/0135175 A1 | 6/2008 | Higuchi |

FOREIGN PATENT DOCUMENTS

| JP | 58-54316 | 3/1983 |
| JP | 08-086993 | 4/1996 |

(Continued)

OTHER PUBLICATIONS

Machine English Translation of JP 08-086993 (Jul. 13, 2011).*

(Continued)

*Primary Examiner* — Philip Tucker
*Assistant Examiner* — Sing P Chan
(74) *Attorney, Agent, or Firm* — Oblon, Spivak, McClelland, Maier & Neustadt, L.L.P.

(57) ABSTRACT

To provide a thin plate glass laminate of a thin plate glass substrate and a support glass substrate, which suppresses inclusion of bubbles and occurrence of convex defects due to foreign matters, from which the thin plate glass substrate and the support glass substrate are easily separated, and which is excellent in heat resistance, a process for producing a display device using such a thin plate glass laminate, and a support glass substrate for such a thin plate glass laminate.

A thin plate glass laminate formed by laminating a thin plate glass substrate and a support glass substrate, wherein the thin plate glass substrate and the support glass substrate are laminated by means of a silicone resin layer having releasability and non-adhesive properties, and the silicone resin layer and the support glass substrate each has at least one hole that communicate with each other.

12 Claims, 4 Drawing Sheets

FOREIGN PATENT DOCUMENTS

| | | |
|---|---|---|
| JP | 9-105896 | 4/1997 |
| JP | 2000-241804 | 9/2000 |
| JP | 2000-252342 | 9/2000 |
| JP | 2003-216068 | 7/2003 |
| JP | 2003-288028 | 10/2003 |
| WO | WO 2006003853 A2 * | 1/2006 |
| WO | 2007-023534 | 3/2007 |

OTHER PUBLICATIONS

U.S. Appl. No. 12/348,932, filed Jan. 6, 2009, Higuchi.

* cited by examiner

THIN PLATE GLASS LAMINATE, PROCESS FOR PRODUCING DISPLAY DEVICE USING THIN PLATE GLASS LAMINATE, AND SUPPORT GLASS SUBSTRATE

TECHNICAL FIELD

The present invention relates to a laminate of a glass substrate to be used for a display device such as a liquid crystal display or an organic EL display, more specifically, a thin plate glass substrate with a support glass substrate to be used for production of a display device using the thin plate glass substrate, and a process for producing a display device using it, and such a support glass substrate for such a thin plate glass laminate.

BACKGROUND ART

In the field of liquid crystal display devices (LCD), organic EL display devices (OLED), particularly portable display devices such as mobile or portable phones, weight saving and reduction in thickness of display devices have been important objects.

To accomplish the above objects, it has been studied to make a glass substrate to be used for display devices thinner, but if the glass substrate is made thin, a decrease in strength becomes problematic, and the amount of deformation tends to be significant, and accordingly such is not applicable to the existing production line.

Accordingly, a process has been proposed to produce a display device in such a manner that in order to reinforce strength of a glass substrate having a small plate thickness (hereinafter referred to as a "thin plate glass substrate") and to secure a plate thickness applicable to the existing production line, predetermined treatment is applied to produce a display device in a state of a laminate (thin plate glass laminate) obtained by bonding the thin plate glass substrate to another support glass substrate, and after completion of the treatment, the thin plate glass substrate and the support glass substrate are separated (Patent Documents 1 to 6).

In such a process for producing a display device, as a method of laminating and fixing the thin plate glass substrate and the support glass substrate, a method of fixing them by means of electrostatic adsorptivity or vacuum adsorptivity caused between the glass substrates (e.g. Patent Document 1), a method of fixing both ends of the glass substrates by means of glass frit (e.g. Patent Document 2), a method of fusing the two glass substrates by irradiating a portion in the vicinity of the edge surfaces of peripheral portions with laser beams (e.g. Patent Document 3), and a method of disposing a removable adhesive or adhesive sheet over the entire surfaces of the glass substrates, and fixing them by the adhesive force (e.g. Patent Documents 4 to 6) have been proposed.

These methods have latent problems which may adversely affect a display device to be produced.

That is, by the method of fixing the glass substrates by means of electrostatic adsorptivity or vacuum adsorptivity, the method of fixing both ends of the glass substrates by means of glass frit, or the method of fusing the two glass substrates by irradiating a portion in the vicinity of edge surfaces of peripheral portions with laser beams, it is difficult to avoid inclusion of bubbles or convex defects due to foreign matters such as dust in the process of laminating and closely bonding the glass substrates without any interlayer, and accordingly it is difficult to obtain a glass substrate laminate having smooth surface.

In the case of the method of disposing a removable adhesive or adhesive sheet over the entire surface of the glass substrates, it is easy to avoid inclusion of bubbles as compared with the case of directly laminating the glass substrates, and it is considered that convex defects due to foreign matters are less likely to occur. However, it is difficult to separate the thin plate glass substrate and the support glass substrate, and the thin plate glass substrate may be broken at the time of separation. For example, by inserting a razor blade between the thin plate glass substrate and the support glass substrate, it is possible to initiate separation of these substrates, but the glass substrates may be damaged by the razor blade. Further, the thin glass substrate having small thickness may be broken in the step of separating these substrates. Further, remaining of the adhesive on the thin plate glass substrate after the separation is also problematic. Further, the display device production process comprises a step which requires treatment at high temperature, such as a step of firing an insulating film or an alignment film in a process for producing a liquid crystal display device. Therefore, heat resistance for a display device is required for the adhesive or adhesive sheet, but a method which satisfies both heat resistance and removability has not been proposed yet.

Patent Document 1: JP-A-2000-241804
Patent Document 2: JP-A-58-54316
Patent Document 3: JP-A-2003-216068
Patent Document 4: JP-A-8-86993
Patent Document 5: JP-A-9-105896
Patent Document 6: JP-A-2000-252342

DISCLOSURE OF THE INVENTION

Object to be Accomplished by the Invention

To solve the above-described problems, the object of the present invention is to provide a thin plate glass laminate of a thin plate glass substrate and a support glass substrate, which suppresses inclusion of bubbles and occurrence of convex defects due to foreign matters, from which the thin plate glass substrate and the support glass substrate are easily separated, and which is excellent in heat resistance, a process for producing a display device using such a thin plate glass laminate, and such a support glass substrate for such a thin plate glass laminate.

Means to Accomplish the Object

To accomplish the above object, the present invention provides a thin plate glass laminate formed by laminating a thin plate glass substrate and a support glass substrate, wherein the thin plate glass substrate and the support glass substrate are laminated by means of a silicone resin layer having releasability and non-adhesive properties, and the silicone resin layer and the support glass substrate each has at least one hole that communicate with each other.

In the thin plate glass laminate of the present invention, the diameter of the hole of the support glass substrate is preferably from 0.1 mm to 10 mm.

In the thin plate glass laminate of the present invention, the silicone resin layer preferably further has low silicone migration properties.

In the thin plate glass laminate of the present invention, the silicone resin layer is preferably a layer made of a cured product of a silicone for release paper.

In the thin plate glass laminate of the present invention, the cured product of a silicone for release paper is preferably a crosslinked product of a linear polyorganosiloxane having vinyl groups at both ends or at both ends and in its side chains, and a methyl hydrogen polysiloxane.

In the thin plate glass laminate of the present invention, it is preferred that the thickness of the thin plate glass substrate is less than 0.3 mm, and that the total thickness of the support glass substrate and the silicone resin layer is at least 0.5 mm.

In the thin plate glass laminate of the present invention, it is preferred that the difference between the coefficient of linear expansion of the support glass substrate and the coefficient of linear expansion of the thin plate glass substrate is at most $15 \times 10^{-7}/°$ C.

The present invention further provides a process for producing a display device using a thin plate glass laminate, which comprises a step of forming on a support glass substrate having at least one hole a silicone resin layer having releasability and non-adhesive properties and having at least one hole, that communicate with the hole of the support glass substrate, a step of laminating a thin plate glass substrate on the silicone resin layer-formed surface of the support glass, a step of carrying out a treatment for producing a display device on the thin plate glass substrate, and a step of injecting a compressed gas into an interface between the silicone resin layer and the thin plate glass substrate through the hole of the support glass substrate to separate the treated thin plate glass substrate and the support glass substrate.

In the process for producing a display device of the present invention, the silicone resin layer is preferably a layer made of a cured product of a silicone for release paper.

In the process for producing a display device of the present invention, the cured product of a silicone for release paper is preferably a crosslinked product of a linear polyorganosiloxane having vinyl groups at both ends or at both ends and in its side chains, and a methyl hydrogen polysiloxane.

In the process for producing a display device of the present invention, the step of forming a silicone resin layer on the support glass substrate is preferably carried out by applying the silicone for release paper on the support glass substrate and curing the silicone for release paper.

In the process for producing a display device of the present invention, the silicone for release paper preferably contains a linear polyorganosiloxane having vinyl groups at both ends or at both ends and in its side chains, a methyl hydrogen polysiloxane, and a platinum catalyst.

In the process for producing a display device of the present invention, the silicone for release paper preferably contains substantially no non-reactive silicone.

In the process for producing a display device of the present invention, application of the silicone for release paper is preferably carried out by a screen printing method.

In the process for producing a display device of the present invention, the heat-curing of the silicone for release paper is preferably carried out at a temperature of from 50 to 250° C. after the silicone is applied.

In the process for producing a display device of the present invention, the step of laminating a thin plate glass substrate on the silicone resin layer-formed surface of the support glass substrate is preferably carried out by vacuum pressing or vacuum lamination.

Further, the present invention provides a support glass substrate to be laminated with a thin plate glass substrate, which comprises a silicone resin layer having releasability and non-adhesive properties and formed on one surface of the support glass substrate, wherein the support glass substrate and the silicone resin layer each has at least one hole that communicate with each other.

Effects of the Invention

The thin plate glass laminate of the present invention has such advantages that since a thin plate glass substrate and a support glass substrate are laminated by means of a flexible silicone resin layer, bubbles are less likely to be included at the time of lamination, and even if bubbles are included, the bubbles can easily be removed by pressure bonding by means of rolls or pressing. Particularly when lamination of the thin plate glass substrate and the support glass substrate is carried out by a vacuum lamination method or a vacuum pressing method, inclusion of bubbles is suppressed, and adhesion properties are favorable. Further, when lamination of the thin plate glass substrate and the support glass substrate is carried out by a vacuum lamination method or a vacuum pressing method, even if very small bubbles remain, the bubbles will not grow by heating, whereby convex defects are less likely to occur in the thin plate glass substrate.

Further, it also has such an advantage that even when foreign matters such as dust are included in the interface of the laminate, the flexible silicone resin layer will deform, whereby convex defects are less likely to occur in the thin plate glass laminate.

Further, since the layer interposed between the thin plate glass substrate and the support glass substrate is a silicone resin layer excellent in heat resistance, the laminate is excellent in heat resistance.

In the thin plate glass laminate of the present invention, since the thin plate glass substrate and the support glass substrate are laminated by means of a silicone resin layer having releasability and non-adhesive properties, the thin plate glass substrate and the support glass substrate can easily be separated, whereby the thin plate glass substrate will not be broken when the glass substrates are separated. Such properties are obtained even after the thin plate glass laminate is heated in the air at a temperature of 300° C. for one hour, and such is suitable for use in the process for producing a display device involving heat treatment.

In the thin plate glass laminate of the present invention, by injecting a compressed gas into the interface between the thin plate glass substrate and the silicone resin layer through the hole of the support glass substrate, it is possible to separate the thin plate glass substrate and the support glass substrate without applying the thin plate glass substrate a stress that may cause destruction of glass.

Further, when the silicone resin layer has low silicone migration properties, components in the silicone resin layer will less likely to migrate to the thin plate glass substrate when the glass substrates are separated. Accordingly, after the separation, the support glass substrate on which the silicone resin layer is formed can be repeatedly used for lamination with another thin plate glass substrate. Further, since components in the silicone resin layer are less likely to migrate to the surface of the thin plate glass substrate after separation, bonding failure or the like is less likely to occur when a polarizing plate or the like is bonded to the surface of the thin plate glass substrate.

By the process for producing a display device of the present invention, by use of the thin plate glass laminate of the present invention, deformation of the thin plate glass substrate and breakage of the thin plate glass substrate during production can be prevented, and moreover, breakage of the thin plate glass substrate in the step of separating the thin plate glass substrate and the support glass substrate, whereby the yield of a display device to be produced can be improved.

In a case where in the process for producing a display device of the present invention, the step of laminating a thin plate glass substrate on the silicone resin layer-formed surface of the support glass substrate is carried out by vacuum pressing or vacuum lamination, inclusion of bubbles in the silicone resin layer can be suppressed. As a result, in a step of forming a transparent electrode such as ITO in vacuum, occurrence of defects originating from the bubbles included in the silicone resin layer can be suppressed.

MEANINGS OF SYMBOLS

Figure 1:
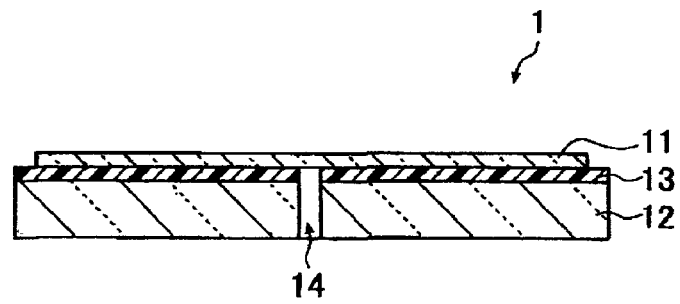
FIG. 1 is a cross-sectional schematic view showing an example of the thin plate glass laminate of the present invention.

1: Thin plate glass laminate
11: Thin plate glass substrate
12: Support glass substrate
13: Silicone resin layer
14: Hole
20: Display device
21: Sealing member
22: Structural member
30: Tube for injecting compressed gas (compressed air)
40: Sealing agent
50: Fixing table

BEST MODE FOR CARRYING OUT THE INVENTION

Figure 2:
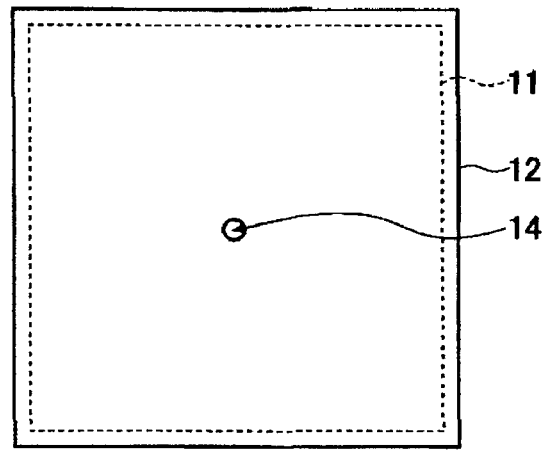
FIG. 2 is a plan view of the thin plate glass laminate of FIG. 1 observed from downside.

Now, the thin plate glass laminate of the present invention will be described with reference to drawings. FIG. 1 is a cross-sectional schematic view showing an example of the thin plate glass laminate of the present invention, and FIG. 2 is a plan view of the thin plate glass laminate of FIG. 1 observed from a downside.

As shown in FIG. 1, in the thin plate glass laminate 1 of the present invention, a thin plate glass substrate 11 and a support glass substrate 12 are laminated via a silicone resin layer having releasability and non-adhesive properties (hereinafter such a layer may be referred to as "silicone resin layer" in this specification). The support glass substrate 12 and the silicone resin layer 13 each has a hole 14 that communicate with each other. From now, in this specification, the hole provided in the support glass substrate 12 and the hole formed in the silicone resin layer 13 that communicate with each other are collectively referred to as a hole 14. As shown in FIG. 2, a hole 14 is formed in the central portion of the support glass substrate 12.

As described later in detail, in the thin plate glass laminate 1 of the present invention, it is possible to easily separate the thin plate glass substrate 11 and the support glass substrate 12 by injecting a compressed gas into the interface between the silicone resin layer 13 and the thin plate glass substrate 11 through the hole 14.

Now, constituent elements of the thin plate glass laminate 1 of the present invention will be described.

The thin plate glass substrate 11 is a glass substrate for a display device such as a LCD or an OLED, and has a thickness less than 0.3 mm. The thickness of the thin plate glass substrate 11 is preferably at most 0.2 mm, more preferably at most 0.1 mm. Further, the thickness of the thin plate glass substrate 11 is preferably at least 0.05 mm.

Here, a display device to which the present invention is to be applied is mainly a small display device to be used for a mobile terminal such as a mobile phone or a PDA. The display device is mainly an LCD or an OLED, and the LCD includes TN, STN, FE, TFT and MIM types.

The properties required for a thin plate glass substrate 11 such as the heat shrinkage ratio, the surface shape and the chemical resistance vary depending upon the type of the display device. Therefore, the thin plate glass substrate may be made of alkali glass. However, the thin plate glass substrate is preferably made of alkali-free glass, which has a low heat shrinkage ratio.

In the present invention, the thin plate glass substrate 11 is preferably one having a low heat shrinkage ratio. In the case of glass, as the index of thermal expansion and heat shrinkage, the coefficient of linear expansion as defined in JIS R3102 (1995) is employed. The thin plate glass substrate preferably has a coefficient of linear expansion of at most $50 \times 10^{-7}/°C$., more preferably at most $45 \times 10^{-7}/°C$., furthermore preferably at most $40 \times 10^{-7}/°C$., more preferably at most $30 \times 0$-$7/°C$., furthermore preferably at most $20 \times 10^{-7}/°C$.

The support glass substrate 12 is required to be thicker than the thin plate glass substrate 11, since it is to be laminated on the thin plate glass substrate 11 for the purpose of reinforcing strength of the thin plate glass substrate 11. The thickness of the support glass substrate 12 is preferably such that the laminate with the thin plate glass substrate 11 can be carried on the existing production line. For example, in a case where the existing production line is designed to carry substrates having a thickness of 0.5 mm and the thickness of the thin plate glass substrate 11 is 0.1 mm, the thickness of the support glass substrate 12 is preferably such that the total thickness of the support glass substrate and the silicone resin layer 13 is 0.4 mm.

Further, as described above, the thickness of the thin plate glass substrate 11 is preferably at most 0.2 mm. The existing production line is most commonly designed to carry glass substrates having a thickness of 0.7 mm. Accordingly, the total thickness of the support glass substrate 12 and the silicone resin layer 13 is preferably at least 0.5 mm. However, the production line is not limited to one designed to carry glass substrates having a thickness of 0.5 mm or 0.7 mm, and it is designed to carry glass substrates having another thickness in some cases. For example, it may be designed to carry glass substrates having a thickness less than 0.5 mm in some cases, or may be designed to carry glass substrates having a thickness exceeding 0.7 mm in other cases.

Considering the thickness of the after-mentioned silicone resin layer 13, the thickness of the support glass substrate 12 is preferably from 0.3 to 0.8 mm. Further, the total thickness of the support glass substrate 12 and the silicone resin layer 13 is preferably at least 0.5 mm and preferably at most 1.0 mm.

Further, the support glass substrate 12 is to reinforce the strength of the thin plate glass substrate 11, and accordingly, its material is not particularly limited, and it may be either alkali glass or alkali-free glass. However, the support glass substrate 12 preferably has a coefficient of linear expansion not significantly different from the coefficient of linear expansion of the thin plate glass substrate. If the coefficient of linear expansion of the support glass substrate 12 is higher than the coefficient of linear expansion of the thin plate glass substrate 11, expansion of the support glass substrate 12 is suppressed by the thin plate glass laminate 1 in a heating step in the process for producing a display device, whereby the thin plate glass laminate 1 will be warped, and on the contrary if the coefficient of linear expansion of the support glass substrate 12 is lower than the coefficient of linear expansion of the thin plate glass substrate 11, the thin plate glass substrate 11 will be separated from the silicone resin layer 13 due to expansion of the thin plate glass substrate 11.

As described above, since it is sufficient that the support glass substrate 12 and the thin plate glass substrate are not significantly different in the coefficient of linear expansion, the coefficients of linear expansion of these substrates are not necessarily completely agree but they may differ to a small extent. The difference in the coefficient of linear expansion between the thin plate glass substrate 11 and the support glass substrate 12 is preferably at most $35 \times 10^{-7}/°$ C., more preferably at most $25 \times 10^{-7}/°$ C.x, furthermore preferably at most $15 \times 10^{-7}/°$ C.

The support glass substrate 12 is to reinforce the thin plate glass substrate 11 and becomes a base to hold the thin plate glass substrate 11 when the thin plate glass laminate 1 moves on the production line. Accordingly, its size is preferably equal to or larger than the thin plate glass substrate 11.

The support glass substrate 12 and the silicone resin layer 13 each has at least one hole 14 that communicate with each other. Namely, in each of the support glass substrate 12 and the silicone resin layer 13, at least one hole 14 is provided at a position that agrees with each other in a state of thin plate glass laminate 1 (in a state that the support glass substrate 12 and the silicone resin layer 13 are laminated).

In a step of separating the thin plate glass substrate 11 and the support glass substrate 12, by injecting a compressed gas into an interface between the silicone resin layer 13 and the thin plate glass substrate 11 through the hole 14, the silicone resin layer 13 and the thin plate glass substrate 11 are peeled off, and the thin plate glass substrate 11 and the support glass substrate 12 can easily be separated.

Figure 3:
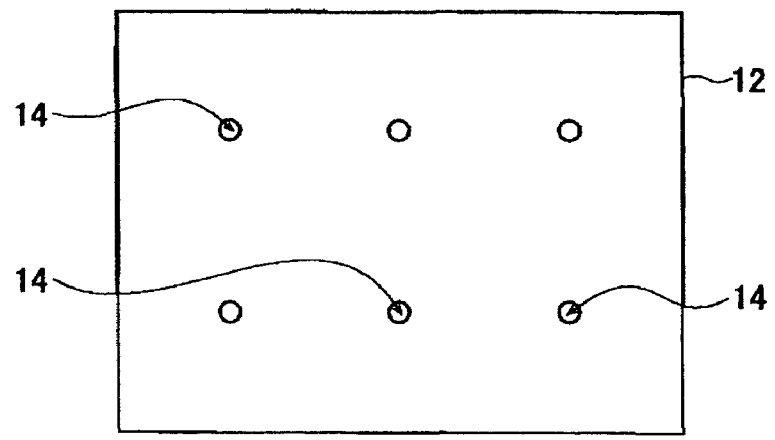
FIG. 3 is a plan view showing a variation of support glass substrate to be employed in the present invention.

FIG. 2 shows only one hole 14 in the central portion of the support glass substrate 12, but the number and arrangement of the hole 14 provided in the support glass 12 are not limited thereto, and a plurality of holes 14 may be formed in the support glass substrate 12. FIG. 3 is a plan view showing a variation of support glass substrate to be employed in the present invention. In the support glass substrate 12 shown in FIG. 3, six holes 14 are provided at constant intervals. In a case of employing the support glass substrate 12 shown in FIG. 3, in the silicone resin layer to be laminated with the support glass substrate 12, six holes are provided at positions agreeing with the holes 14 provided in the support glass 12. Further, also in a case of forming one hole 14 in the support glass substrate 12, the position of hole 14 is not limited to the central portion of the support glass substrate 12, but it may be in a peripheral portion of the support glass substrate 12.

The number and the arrangement of the holes 14 provided in the support glass substrate 12 are preferably determined so as to maximize a peel-off area between the silicone resin layer 13 and the thin plate glass substrate 11 at a time of injecting a compressed gas into an interface between the silicone resin layer 13 and the thin plate glass substrate 11 through the hole 14.

The size of the hole 14 provided in the support glass substrate 14 is not particularly limited, and it is appropriately selected according to e.g. the number or arrangement of the holes 14 provided in the support glass substrate 12, the pressure of the compressed gas injected through the hole 14 or the force required to peel off the silicone resin layer 13 and the thin plate glass substrate 11. As shown in Examples described later, as the hole 14 is large, the pressure of the compressed gas required for separating the thin plate glass substrate 11 and the support glass substrate 12 can be reduced. However, if the hole 14 is too large, at a time of cleaning step carried out in the process of producing display device, an etching solution or cleaning solution may penetrate into the interface between the silicone resin layer 13 and the thin plate glass substrate 11 through the hole 14, whereby the silicone resin layer 13 and the thin plate glass substrate 11 may be peeled off at a timing when the peel off is not desired, or an additive contained in the silicone resin layer 13 may leak out from the hole 14. Considering these points, the diameter of the hole 14 provided in the support glass substrate 12 is preferably from 0.1 mm to 10 mm, particularly preferably from 0.5 mm to 2 mm.

In production of the thin plate glass laminate of the present invention, on the support glass substrate having at least one hole, the silicone resin layer having releasability and non-adhesive properties and having at least one hole that communicates with the hole of the support glass substrate is formed, and then the thin plate glass substrate is laminated on the silicone resin layer-formed surface of the support glass substrate.

The silicone resin layer having releasability and non-adhesive properties is a silicone resin layer having proper flexibility, and means one which fixes the thin plate glass substrate by force resulting from Van der Waals force among facing solid molecules very close to one another, i.e. bond strength, not one which fixes the thin plate glass substrate by adhesive force such as an adhesive. Specific embodiments of the silicone resin layer having releasability and non-adhesive properties will be described hereinafter.

Since the silicone resin layer having releasability and non-adhesive properties fixes the thin plate glass substrate by bond strength, it has a high value of withstanding force against a force to displace the thin plate glass substrate and the support glass substrate in parallel with the interface of the laminate, i.e. withstanding shear fore. Accordingly, the thin plate glass substrate will not slip from the support glass substrate during production of a display device. Accordingly, the substrates will not be separated due to slippage.

On the other hand, due to releasability and non-adhesive properties which the silicone resin layer has, the force to separate the thin plate glass substrate from the support glass substrate in a vertical direction, i.e. adhesive force that withstands peel force, is very low. Accordingly, it is possible to easily separate the support glass substrate from the thin plate glass substrate after predetermined treatment is applied to produce a display device on the thin plate glass substrate.

The silicone resin layer is excellent in heat resistance and accordingly even after it is subjected to heat treatment, for example, it is heated in the air at a temperature of 300° C. for one hour, it exhibits the above properties of high withstanding shear force and very low adhesive force that withstands peel force. Hereinafter in the present specification, the silicone resin layer subjected to heat treatment, for example heated in the air at a temperature of 300° C. for one hour having the above properties i.e. having high shear force and having very low adhesive force that withstands peel force, will be referred to as "being excellent in releasability after heat treatment.

Since the silicone resin layer having releasability and non-adhesive properties has proper flexibility, bubbles are less likely to be included at the time of lamination, and even if bubbles are included, the bubbles can easily be removed by pressure bonding by means of rolls, pressing or the like. Further, even when foreign matters such as dust are included in the interface of the laminate, convex defects of the thin plate glass laminate are less likely to form since the flexible resin layer deforms.

The silicone resin layer having releasability and non-adhesive properties is preferably a cured product of a silicone for release paper. The silicone for release paper comprises, as the chief agent, a silicone containing a linear dimethyl polysiloxane in its molecule which is particularly excellent in release properties among silicones. The silicone for release paper contains the above chief agent and a crosslinking agent, and is fixed on the surface of the substrate by curing by means of a catalyst, a photopolymerization initiator or the like. The cured coating film of the silicone for release paper has excellent release properties and appropriate flexibility. When the silicone for release paper having such properties is used as the silicone resin layer, a silicone resin layer having appropriate flexibility and having releasability and non-adhesive properties can be obtained The silicone for release paper can be classified by the curing mechanism into a condensation reaction silicone, an addition reaction silicone, an ultraviolet-curable silicone and an electron beam-curable silicone. Any of these can be used in the present invention. However, most preferred is an addition reaction silicone from such a viewpoint that the curing reaction is easily carried out, and a silicone resin layer having releasability and non-adhesive properties is easily formed when the cured coating film is formed, and from the viewpoint of heat resistance of the cured product.

The addition reaction silicone comprises a chief agent comprising a linear polyorganosiloxane having vinyl groups at both ends or at both ends and in its side chains, and a crosslinking agent comprising a methyl hydrogen polysiloxane, and is to be subjected to heat curing reaction in the presence of a platinum catalyst.

The linear polyorganosiloxane having vinyl groups at both ends or at both ends and in its side chains is a compound represented by the following formula. In the formula, each of m and n is an integer and may be 0. In a case where m is 0, it is a linear polyorganosiloxane having vinyl groups at both ends. When m is an integer of at least 1, it is a linear polyorganosiloxane having vinyl groups at both ends and in its side chains.

Formula 1

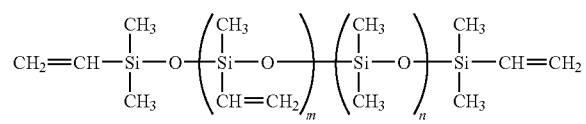

The methyl hydrogen polysiloxane is a compound represented by the following formula, and in the formula, a is an integer, and b is an integer of at least 1.

Formula 2

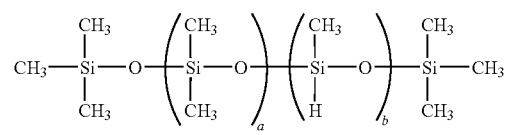

The catalyst to be used for heat curing reaction is preferably a platinum catalyst, and as the platinum catalyst, known one may be used. Specifically, it may, for example, be chloroplatinic acid such as tetrachloroplatinic(II) acid or hexachloroplatinic(IV) acid, an alcohol compound of chloroplatinic acid, an aldehyde compound or a complex salt of chloroplatinic acid with an olefin. Here, the amount of the platinum catalyst used is preferably from 0.1 to 20 parts by mass, more preferably from 1 to 10 parts by mass per 100 parts by mass of the silicone for release paper.

The silicone for release paper may be a solvent, emulsion or solventless form, and any form can be used. However, in view of productivity, safety and environmental properties, the solventless form is preferred. In the case of using the solventless form, bubbles are less likely to remain in the resin layer since a solvent which causes bubbles at the time of heat curing, ultraviolet curing or electron beam curing is not contained.

The silicone resin layer having releasability and non-adhesive properties may be formed only by one silicone for release paper or may be formed by two or more silicones for release paper. In a case where it is formed by two or more silicones for release paper, it may be a silicone resin layer having a multilayer structure in which the two or more silicones for release paper are laminated with each other, or may be a mixed silicone resin layer containing the two or more silicones for release paper in one layer.

The silicone resin layer having releasability and non-adhesive properties is preferably such that components in the silicone resin layer are less likely to migrate to the thin plate glass substrate when the glass substrates are separated, that is, it preferably has low silicone migration properties. The degree of easiness of migration of components in the silicone resin layer can be judged employing the residual adhesion ratio of the silicone resin layer as an index. The residual adhesion ratio of the silicone resin layer can be measured by the following method.

(Method for Measuring Residual Adhesion Ratio)

A standard adhesive tape (CELLOTAPE (trade mark) CT405A-15 (manufactured by NICHIBAN Co., Ltd.)) with a width of 15 mm is bonded to the surface of the silicone resin layer manually and heated at 70° C. for 20 hours in the air. After a lapse of 20 hours, the standard adhesive tape is peeled from the silicone resin layer. The peeled standard adhesive tape is bonded to the surface of a clean glass substrate (e.g. AN100 (manufactured by Asahi Glass Company, Limited)), and then the 180° peel strength (300 mm/min) is measured (peel strength (A)).

The same standard adhesive tape as above is bonded to the surface of a clean glass substrate (e.g. AN100 (manufactured by Asahi Glass Company, Limited)) manually and then left at room temperature in the air for 20 hours. After a lapse of 20 hours, the standard adhesive tape is peeled from the surface of the glass substrate. The peeled standard adhesive tape is bonded to the surface of a glass substrate (e.g. AN100 (manufactured by Asahi Glass Company, Limited)), and the 180° peel strength (300 mm/min) is measured (peel strength (B)). The residual adhesion ratio is determined from the following formula:

Residual adhesion ratio(%)=peel strength($A$)/peel strength($B$)×100

The silicone resin layer having releasability and non-adhesive properties preferably has a residual adhesion ratio obtained by the above measuring method of at least 95%, more preferably at least 98%. When the residual adhesion ratio is at least 95%, it is considered that migration of components in the resin layer from the silicone resin layer to the thin plate glass substrate surface is very low. Therefore, after the glass substrates are separated, the support glass substrate on which the silicone resin layer is formed can be repeatedly used for lamination with another thin plate glass substrate. Further, since components in the silicone resin layer are less likely to migrate to the surface of the thin plate glass substrate after separation, bonding failure or the like is less likely occur when a polarizing plate or the like is bonded to the surface of the thin plate glass substrate.

To obtain a silicone resin layer having low silicone migration properties, a silicone for release paper containing no components having high migration properties should be used. As a common method, a non-reactive silicone is blended in some cases so that the silicone for release paper has releasability. In such a case, as the non-reactive silicone, a linear dimethylpolysiloxane having a very high molecular weight or a relatively low molecular weight linear dimethylpolysiloxane having compatibility with the cured coating film lowered by introducing a phenyl group or a higher alkyl group, is used. Since such a non-reactive silicone is a component having high migration properties, the silicone for release paper used in the present invention preferably has a non-reactive silicone content of at most 5 mass %, and it more preferably contains substantially no non-reactive silicone.

In the present invention, a suitable silicone for release paper may, for example, be specifically KNS-320A, KS-847 (each manufactured by Shin-Etsu Silicones), or TPR6700 (manufactured by GE Toshiba Silicone).

The thickness of the silicone resin layer having releasability and non-adhesive properties is preferably from 1 to 100 μm. If the silicone resin layer is thinner than 1 μm, bond strength between the thin plate glass substrate and the silicone resin layer may be insufficient. Further, in a case where foreign matters are present, they are likely to lead to convex defects of the thin plate glass substrate. On the other hand, if it exceeds 100 μm, such a silicone resin layer is less likely to contribute to properties as the silicone resin layer having releasability and non-adhesive properties, and curing of the silicone resin will take long, such being uneconomical. The thickness of the silicone resin layer is more preferably from 5 to 20 μm. When the thickness of the silicone resin layer is from 5 to 20 μm, favorable bond strength will be obtained over thin plate glass substrates having a wide range of thicknesses.

A method of forming a silicone resin layer having releasability and non-adhesive properties on the support glass substrate is not particularly limited and is properly selected from known methods. In a case where a silicone for release paper is used for the silicone resin layer, the silicone for release paper is applied to the surface of the support glass substrate and the silicone for release paper is cured before the thin plate glass is laminated. Here, it is possible to form a silicone resin layer having at least one hole communicating with a hole of the support glass substrate by using a coating method in which a silicone for release paper does not penetrate into the hole of the support glass substrate at a time of applying a silicone for release paper on the support glass substrate provided with a hole in advance. Specifically, a method of filling the hole provided in the support glass substrate with a sealing agent, or sealing the hole by pasting e.g. a tape, and in this state, coating a silicone for release paper, curing the silicone for release paper to form a silicone resin layer, followed by removing e.g. the sealing agent or the tape, may be employed.

As a method of applying the silicone for release paper, a known method may be used. Specifically, it may, for example, be a spray coating method, a die coating method, a spin coating method, a dip coating method, a roll coating method, a bar coating method, a screen printing method or a gravure coating method. Such a coating method can properly be selected depending upon the type of the silicone for release paper. For example, in a case where the silicone for release paper is a solventless type, the die coating method, the spin coating method or the screen printing method is suitable. Among these, the screen printing method is particularly preferred since this method enables to form a silicone resin layer having at least one hole communicating with the hole of the support glass substrate without requiring sealing of the hole before coating.

In a case where the silicone for a release paper is a solventless type, the application amount is preferably from 1 g/m$^2$ to 100 g/m$^2$, more preferably from 5 g/m$^2$ to 20 g/m$^2$.

Here, the process may be such that after coating an entire surface of a support glass substrate provided with no hole in advance with a silicone for release paper and curing the silicone for release paper to form a silicone resin layer, then, the holes of the support glass substrate and the silicone resin layer may be formed by physically forming a hole perforating through the silicone resin layer and the support glass substrate.

In the case of an addition reaction silicone, a mixture of the silicone for release paper containing the chief agent and the crosslinking agent with a catalyst is applied to the support glass substrate by any of the above methods, and then heat-cured. The heat-curing conditions vary depending upon the amount of the catalyst blended, and for example, when 2 parts by mass of a platinum catalyst is blended based on 100 parts by mass of the silicone for release paper, the mixture is heat-cured in the air at from 50° C. to 250° C., preferably from 100° C. to 200° C. for from 1 to 10 minutes, preferably from 1 to 5 minutes.

In order to obtain a silicone resin layer having low silicone migration properties, it is preferred that the curing reaction proceeds as far as possible so that unreacted silicone components will not remain in the silicone resin layer. By heat-curing under the above conditions, unreacted silicone components will not remain in the silicone resin layer. If the heating time is too long or the heating temperature is too high as compared with the above conditions, oxidative destruction of the silicone resin will take place simultaneously, and low molecular weight silicone components will form, thus increasing the silicone migration properties. Thus, it is preferred that the curing reaction proceeds as far as possible so that unreacted silicone components will not remain in the silicone resin layer, to obtain favorable releasability after heat treatment also.

By heat-curing the silicone for release paper, the silicone resin cured product is chemically bonded to the support glass, and the silicone resin layer is bonded to the support glass by an anchor effect. By these actions, the silicone resin layer is fixed to the support glass substrate.

On the other hand, the thin plate glass substrate is fixed to the silicone resin layer by force resulting from Van der Waals force among facing solid molecules very close to one another, i.e. bond strength. Therefore, after the thin plate glass substrate laminated on the silicone resin-formed surface of the support glass substrate is separated, residue of the silicone resin layer is prevented from remaining on the surface of the thin plate glass substrate after separation.

Namely, by use of the silicone for release paper, the support glass substrate and the thin plate glass substrate can be maintained in a state where they are laminated, and in addition, when the thin plate glass substrate is separated, residue of the silicone resin layer is prevented from remaining on the surface of the thin plate glass substrate, and consequently, the object of the present invention can be accomplished.

The procedure of laminating the thin plate glass substrate on the silicone resin-formed surface of the support glass substrate can be carried out by a known means. For example, the thin plate glass substrate is laminated on the silicone resin-formed surface in normal pressure environment, and then the laminate is pressure bonded by means of rolls or pressing. By pressure bonding by rolls or pressing, the silicone resin layer and the thin plate glass substrate will more closely be bonded.

Further, by pressure bonding by means of rolls or pressing, bubbles included in the laminate will easily be removed.

Particularly, with a view to suppressing inclusion of bubbles and securing favorable bonding, it is preferred to employ a vacuum lamination method or a vacuum pressing method. Such an advantage is also obtained that by lamination in a vacuum, bubbles will not grow by heating even if very small bubbles remain, whereby convex defects of the thin plate glass substrate are less likely to form.

When the thin plate glass substrate is laminated on the silicone resin layer-formed surface of the support glass substrate, it is necessary to sufficiently clean the surface of the thin plate glass substrate and to laminate them in an environment with high cleanness.

Extremely small foreign matters will be absorbed in the flexible silicone resin layer by its deformation and will not influence over smoothness of the surface of the thin plate glass substrate after lamination, but depending upon the amount and the size of the foreign matters, they may lead to convex defects on the surface of the thin plate glass substrate after lamination.

Figure 4:
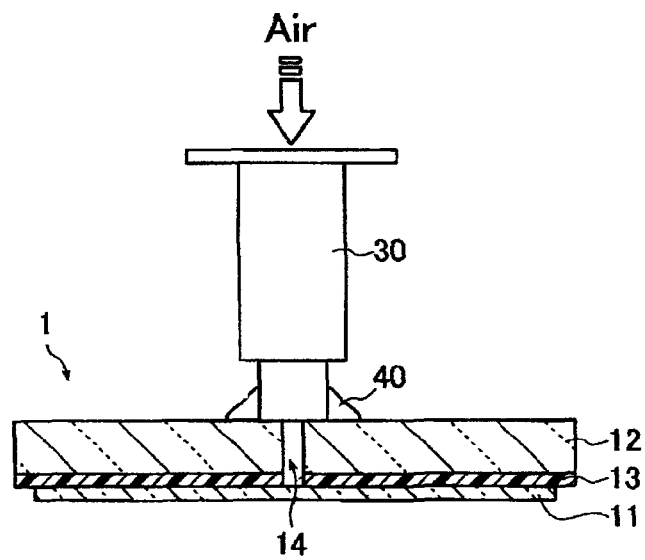
FIG. 4 is a view showing a procedure of separating a thin plate glass substrate and a support glass substrate of the thin plate glass laminate of FIG. 1.

In the thin plate glass laminate of the present invention, as shown in FIG. 4, by injecting a compressed gas into an interface between the silicone resin layer 13 and the thin plate glass substrate 11 through a hole 14 provided in the support glass substrate 12, to peel off the silicone resin layer 13 and the thin plate glass substrate 11. By this method, it is possible to easily separate the thin plate glass substrate 11 and the support glass substrate 12. At this time, by sealing with a sealing agent 40 the periphery of a joining portion of a tube 30 for injecting compressed gas with the hole 14 so as to prevent the compressed gas from leaking out, more effective separation becomes possible.

Here, the method may one only comprising selecting e.g. the number and arrangement of the holes 14 and the pressure of the compressed gas injecting through the holes 14, and injecting the compressed gas into an interface between the silicone resin layer 13 and the thin plate glass substrate 11, to peel off the silicone resin layer 13 and the thin plate glass substrate 11, to thereby separate the thin plate glass substrate 11 and the support glass substrate 12. However, a manual peeling-off method or a peeling-off method by means of other jigs may also be used in combination, to peel off the silicone resin layer 13 and the thin plate glass substrate 11, to thereby separate the thin plate glass substrate 11 and the support glass substrate 12. In this case, since the injection of the compressed gas into the interface between the silicone resin layer 13 and the thin plate glass substrate 11 can initiate peel-off between the silicone resin layer 13 and the thin plate glass substrate 11, it is possible to peel off the silicone resin layer 13 and the thin plate glass substrate 11 by the manual method or the method by means of other jigs to thereby easily separate the thin plate glass substrate 11 and the support glass substrate 12.

The type of compressed gas injected through the hole 14 is not particularly limited so long as it does not adversely affect the thin plate glass substrate 11, the support glass substrate 12 and the silicone resin layer 13. For the reason of low cost, e.g. a compressed air or a compressed nitrogen is preferably employed. Further, the pressure of the compressed gas injected through the hole 14 is not particularly limited, and it may be appropriately selected within a range that is not likely to damage the plate glass substrate 11 and the support glass substrate 12.

Since the silicone resin layer having releasability and no-adhesive properties remains on the support glass substrate thus peeled off, the substrate can be used for lamination with another thin glass substrate again.

Now, the process for producing a display device of the present invention will be described. In the process for producing a display device of the present invention, after the thin plate glass laminate of the present invention is formed by the above procedure, predetermined treatment to produce a display device on the thin plate glass substrate of the laminate is carried out. In this specification, predetermined treatment to produce a display device widely includes various treatments carried out in production process when a display device such as an LCD or an OLED is produced. Specific examples of treatment carried out includes, with reference to production of an LCD as an example, a step of forming an array on the thin plate glass substrate, and a step of forming a color filter on a thin plate glass substrate different from the above thin plate glass substrate, a step of bonding the thin plate glass substrate on which the array is formed and the thin plate glass substrate on which the color filter is formed (an array/color filter bonding step), and as treatment carried out in these steps, specifically, for example, washing with pure water, drying, film deposition, resist coating, exposure, developing, etching and removal of resist may, for example, be mentioned. Further, as a step carried out after the array/color filter bonding step, a liquid crystal injection step and a step of sealing the inlet carried out after the treatment may be mentioned, and treatment included in these steps is also included. However, not all these treatments are required to be carried out in a laminate state. For example, in view of strength and handling efficiency, it is preferred to carry out up to the array/color filter bonding step in a laminate state, to separate the thin plate glass substrate and the support glass substrate and then to carry out the liquid crystal injection treatment.

Here, in the process for producing a display device of the present invention, not both a glass substrate on which an array is to be formed and a glass substrate on which a color filter is to be formed should be a thin plate glass substrate. For example, a thin plate glass substrate on which an array is formed and a glass substrate having an ordinary thickness on which a color filter is formed may be bonded, or a glass substrate having an ordinary thickness on which an array is formed and a thin plate glass substrate on which a color filter is formed may be bonded. In these cases, such an advantage can be obtained that mechanical strength can be improved, although the total thickness of the display device after formed into cells tends to be thick. The glass substrate having an ordinary thickness means a glass substrate having a thickness of at least 0.3 mm.

Further, with reference to production of an OLED as an example, steps of forming an organic EL structure on the thin plate glass substrate includes various steps such as a step of forming a transparent electrode, a step of evaporating a hole injection layer, a hole transport layer, an electroluminescence layer, an electron transport layer, etc., and a sealing step, and as treatment carried out in these steps, specifically, for example, film deposition treatment, evaporation treatment and treatment to bond a sealing plate may be mentioned.

Figure 5:
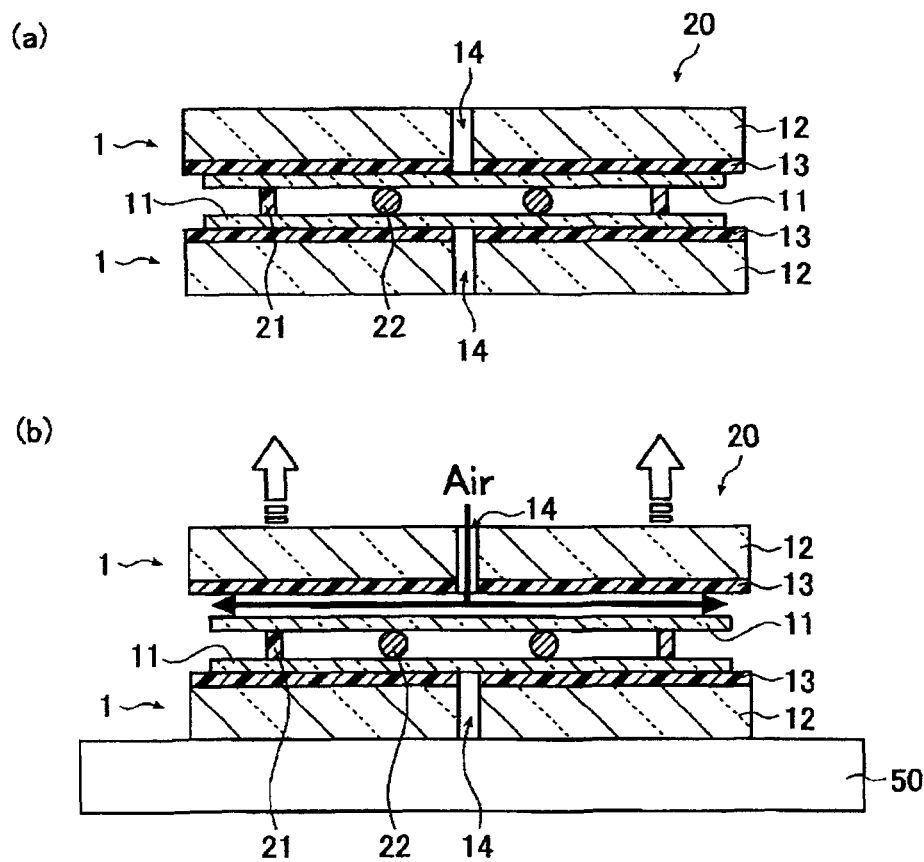
FIGS. 5(a) and 5(b) are views showing a procedure of separating a thin plate glass substrate and a support glass substrate in a display device after an array-color filter lamination step is carried out.

After the above predetermined treatment is carried out, the thin plate glass substrate and the support glass substrate are separated. FIGS. 5(a) and 5(b) are views showing the procedure of separating a thin plate glass substrate and a support glass substrate in a display device after an array-color filter lamination step is carried out.

In FIG. 5(a), two thin plate glass laminates 1 are laminated by a sealing member 21 to form a display device 20. In the display device 20, in an enclosed space defined by the two thin plate glass substrates 11 and the sealing member 21, a structure 22 such as an array or a color filter is formed.

As shown in FIG. 5(b), in a state that one of the two thin plate glass laminates 1 constituting the display device 20 is fixed to a fixing table 50 by e.g. vacuum suction, a compressed gas is injected into an interface between the silicone resin layer 13 and the thin plate glass substrate 11 through a hole provided in the support glass substrate 12 of the other thin plate glass laminate 1, to peel off the silicone resin layer 13 and the thin plate glass substrate 11, to thereby separate the thin plate glass substrate 11 and the support glass substrate 12. Thereafter, in a state that the display device 20 is flipped and the thin plate glass substrate 11 separated from the support glass substrate 12 is fixed to the fixing table 50, a compressed gas is injected into an interface between the silicone resin layer 13 and the thin plate glass substrate 11 through the hole 14 provided in the support glass substrate 12 of the thin plate glass laminate 1, whereby it is possible to peel off the silicone resin layer 13 and the thin plate glass substrate 11 to separate the thin plate glass substrate 11 and the support glass substrate 12.

After the thin plate glass substrate and the support glass substrate are separated, a display device having a thin plate glass substrate can be obtained via required desired steps. The steps carried out include, in the case of an LCD, for example, a separation step into cells having a desired size, a step of injecting liquid crystal and sealing the inlet, a step of bonding a polarizing plate and a module forming step. In the case of an OLED, in addition to these steps, a step of assembling the thin plate glass substrate on which an organic EL structure is formed and an opposing substrate, is included. Here, the separation step into cells having a desired size is carried out preferably by cutting with a laser cutter, whereby strength of the thin plate glass substrate will not decrease by the cutting treatment, and no cullet will form.

Further, the present invention provides also a support glass substrate to be laminated with a thin plate glass substrate, which comprises a silicone resin layer having releasability and non-adhesive properties formed on one surface of the support glass substrate, wherein each of the support glass substrate and the silicone resin layer has at least one hole that communicate with each other.

EXAMPLES

Example 1

In this Example, a thin plate glass laminate shown in FIGS. 1 and 2 was produced.

In the central portion of a support glass substrate 12 (AN100, manufactured by Asahi Glass Company, Limited) of 100 mm×100 mm×0.7 mm thick and having a linear expansion coefficient of $38\times10^{-7}/°$ C., a hole 14 of 1.5 mm in diameter was formed by a diamond drill as shown in FIG. 2. The substrate 12 was cleaned by e.g. purified water cleaning and UV cleaning, and coated with a mixed product (application amount 15 g/m$^2$) of 100 mass parts of a non-solvent addition reaction type silicone for release paper (KNS-320A, manufactured by Shin-Etsu Silicone) and 2 mass parts of platinum type catalyst (CAT-PL-56, manufactured by Shin-Etsu Silicone), by a screen printing machine, and the coated product was heat-cured at 100° C. for 3 min in the atmospheric air to form a silicone resin layer 13 of 15 μm thick. A portion of the support glass substrate 12 where the hole 14 was provided, no silicone resin layer 13 was formed, and a hole 14 perforating through the support glass substrate 11 and the silicone resin layer 13 was formed.

A surface of a thin plate glass substrate (AN100, manufactured by Asahi Glass Company, Limited) of 95 mm×95 mm×0.1 mm thick and having a linear expansion coefficient of $38\times10^{-7}/°$ C. that contact with the silicone resin layer was cleaned by e.g. purified water cleaning, and UV cleaning, and a silicone-resin-layer-formed surface of the support glass and the thin plate glass substrate were laminated by a vacuum press in an environment of room temperature, to obtain a thin plate glass laminate 1.

In the thin plate glass laminate 1, the thin plate glass substrate was close contact with the silicone resin layer without including bubbles, there was no convex defect and its smoothness was good.

[Peel Test]

Figure 6:
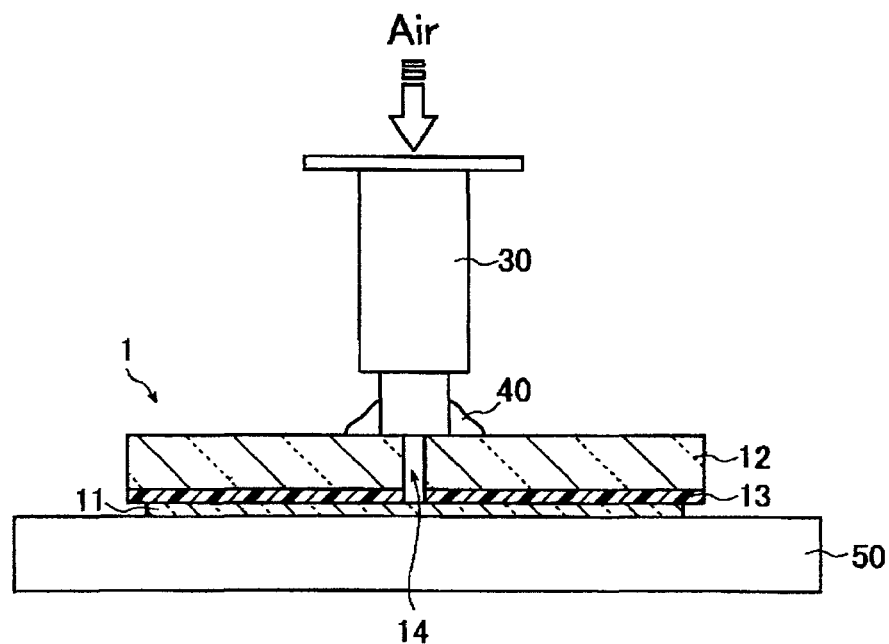
FIG. 6 is a view showing a procedure of separating a thin plate glass substrate and a support glass substrate of a thin plate glass laminate 1 in Example 1.

As shown in FIG. 6, the thin plate glass laminate 1 was mounted on a fixing table 50 so that the thin plate glass substrate 11 was under side of the thin plate glass laminate 1 and they were fixed by vacuum suction. In this state, a tube 30 for injecting compressed air was connected to the hole 14 provided in the support glass substrate 12 and the periphery of the connection was sealed with a sealing agent 40 so as to prevent air from leaking. Thereafter, a compressed air of 1.41 kgf/cm$^2$ ($13.8\times10^4$ Pa) was injected into an interface between the silicone resin layer 13 and the thin plate glass substrate 11 through the hole 14, and as a result, peel-off between the silicone resin layer 13 and the thin plate glass substrate 12 progressed and the support glass substrate 12 was easily separated from the thin plate glass substrate 11 manually by hand.

The same procedure was carried out with respect to a thin plate laminate 1 after it was heated at 300° C. for 1 hr. A compressed air of 1.75 kgf/cm$^2$ ($17.2\times10^4$ Pa) was injected into an interface between the silicone resin layer 13 and the thin plate glass substrate 11 through the hole 14, and as a result, peel-off between the silicone resin layer 13 and the thin plate glass substrate 11 progressed, and the support glass substrate 12 was easily separated from the thin plate glass substrate 11 manually by hand.

Examples 2 and 3

The procedure was carried out in the same manner as Example 1 except that the diameter of the hole 14 was changed to 1 mm (Example 2) or 2 mm (Example 3).

Figure 7:
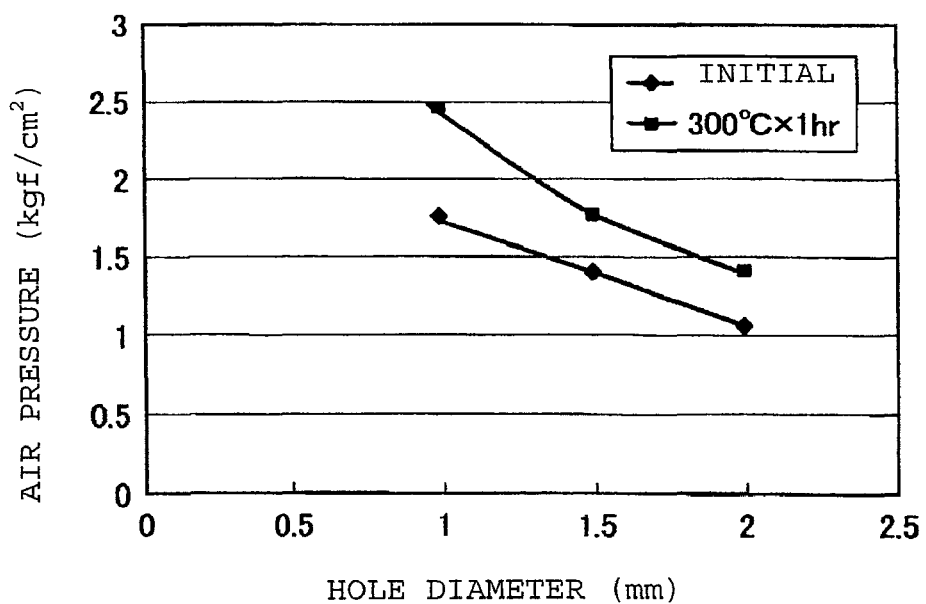
FIG. 7 is a graph showing the results of peel test of Examples 1 to 3.

FIG. 7 shows the results of peel tests of Examples 1 to 3. As evident form FIG. 7, when the diameter of the hole 14 increases, the pressure of compressed air required to separate the thin plate glass substrate 11 and the support glass substrate 12 can be lowered. Further, in a case of thin plate glass laminate that was heated at 300° C. for 1 hour, the pressure of compressed air needs to be higher than that of a thin plate glass laminate before heating, but support glass substrate 12 was easily removed from the thin plate glass substrate 11 manually by hand.

Example 4

Figure 8:
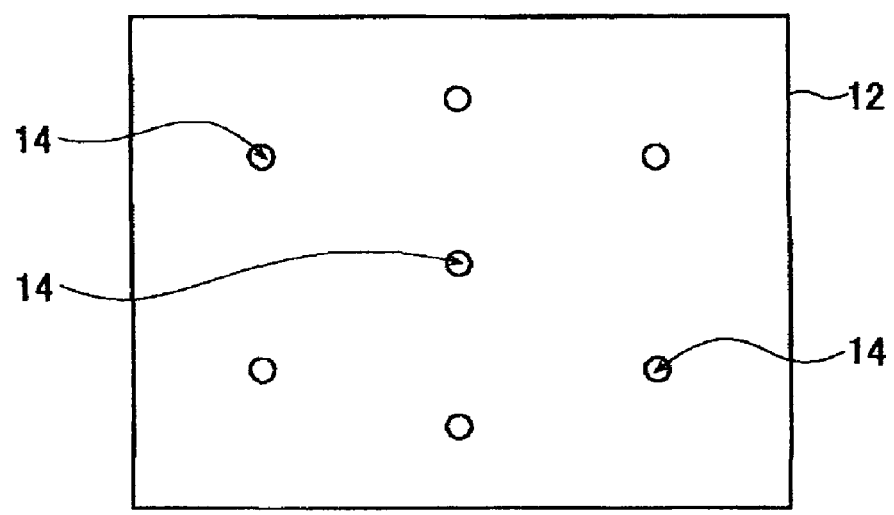
FIG. 8 is a plan view of a support glass substrate employed in Example 4.

At predetermined positions shown in FIG. 8 in a support glass substrate (AN100, manufactured by Asahi Glass Company, Limited) of 400 mm×300 mm×0.7 mm thick and having a linear expansion coefficient of 38×10$^{-7}$/° C., seven holes of 1.5 mm in diameter were formed by a diamond drill. The substrate was cleaned by purified water cleaning and UV cleaning etc., and it was coated with a mixed product (application amount 15 g/m$^2$) of 100 mass parts of non-solvent addition reaction type silicone for release paper (KNS-320, manufactured by Shin-Etsu Silicone) and 2 mass parts of platinum type catalyst (CAT-PL-56, manufactured by Shin-Etsu Silicone), it was heat-cured at 100° C. for 3 min to form a silicone resin layer of 15 µm thick. No silicone resin layer was formed on the portions of the support glass substrate where the holes were provided, and holes perforating through the support glass substrate and the silicone resin layer were formed.

A surface of a thin plate glass substrate (AN100, manufactured by Asahi Glass Company, Limited) of 400 mm×300 mm×0.1 mm thick and having a linear expansion coefficient of 38×10$^{-7}$/° C. that contact with the silicone resin layer, was cleaned by a purified water cleaning and UV cleaning etc., and thereafter, the silicone resin layer-formed surface of the support glass and the thin plate glass substrate were laminated by a vacuum press in a room temperature environment to obtain a thin plate glass laminate (thin plate glass laminate 2) of the present invention.

In the thin plate glass laminate 2, the thin plate glass substrate was close contact with the silicone resin layer without including bubbles, there was no convex defect and its smoothness was good.

[Peel Test]

The thin plate glass laminate 2 was mounted on a flat fixing table that had a large number of fine suction holes so that the thin plate glass substrate became under side, and they were fixed by vacuum suction. In this state, a tube for injecting compressed air was connected to each of the holes formed on the support glass substrate, and the periphery of each connection was sealed by a sealing agent to prevent air from leaking. Thereafter, compressed air of 3.5×10$^4$ Pa was injected into the interface between the silicone resin layer and the thin plate glass substrate through the holes formed on the support glass substrate, and as a result, peel-off between the silicone resin layer and the thin plate glass substrate progressed, and the support glass substrate was easily separated from the thin plate glass substrate manually by hand.

Example 5

In this Example, a LCD is produced by employing the thin plate glass laminates 2 obtained in Example 4. Two thin plate glass laminates 2 are prepared and an array-forming step is carried out with respect to one of them to form an array on a surface of its thin plate glass substrate. With respect to the other one of them, a color filter-forming step is carried out to form a color filter on a surface of its thin plate glass substrate. The thin plate glass substrate on which an array is formed and the thin plate glass substrate on which a color filter is formed are laminated, and by the method explained by using FIGS. 5(a) and 5(b), the two support glass substrates are separated. Subsequently, the thin plate glass substrates are cut by using a laser cutter into 28 cells each having a size of 51 mm×38 mm, and thereafter, liquid crystal injection step and a sealing step for an injection port is carried out to form liquid crystal cells. With respect to each of the liquid crystal cells formed, a step of laminating a polarizer is carried out and a module-forming step is carried out to obtain a LCD. A LCD thus obtained has no problem in the property.

Example 6

In this Example, the thin plate glass laminate 2 obtained in Example 4 and a non-alkali glass substrate of 0.7 mm thick are employed to produce a LCD. A thin plate glass laminate 2 is prepared, and a color filter-forming step is carried out to form a color filter on a surface of a thin plate glass substrate. Meanwhile, with respect to a non-alkali glass substrate (AN-100, manufactured by Asahi Glass Company, Limited) of 0.7 mm thick, an array-forming step is carried out to form an array on a surface of the non-alkali glass substrate of 0.7 mm thick.

The thin plate glass substrate laminate on which a color filter is formed and the non-alkali glass substrate of 0.7 mm thick on which an array is formed, are laminated, and thereafter, a support glass substrate is separated by the method explained by using FIGS. 5(a) and 5(b).

Subsequently, the laminate of thin plate glass substrate and the non-alkali glass substrate is divided into 28 cells each having a size of 51 mm×38 mm. In this step, the thin plate glass substrate is cut by a laser cutter. Meanwhile, the non-alkali glass substrate is cut by a laser cutter or a scribe-break method.

Thereafter, a liquid crystal injection step and a sealing step for injection port are carried out to form a liquid crystal cell. With respect to the liquid crystal cell formed, a step of laminating a polarizer is carried out, and subsequently, a module-forming step is carried out to obtain a LCD. A LCD thus obtained has no problem in the properties.

Example 7

In this Example, an OLED is produced by using the thin plate glass laminate 2 obtained in Example 4. A step of forming transparent electrodes, a step of forming auxiliary electrodes, a step of vapor depositing a hole injection layer, a hole transportation layer, a light emission layer and an electron transportation layer etc., and a step of sealing them are carried out to form an organic EL structure on a thin plate glass substrate of the thin plate glass laminate 2. Next, by the method described in Example 4, the thin plate glass substrate and a support glass substrate are separated. Subsequently, the thin plate glass substrate is cut by using a laser cutter into 40 cells each having a size of 41 mm×30 mm, and thereafter, the thin plate glass substrate on which the organic EL structure is formed and an opposing substrate is assembled, and a module-forming step is carried out to produce an OLED. The OLED thus obtained has no problem in the properties.

Comparative Example 1

A thin plate glass laminate 3 of Comparative Example was obtained by carrying out the same procedure as that of Example 4 except that a support glass substrate having no hole was employed. In the thin plate glass laminate 3, in order to peel off a support glass substrate, it was necessary to initiate peel-off at the end of the laminate by a laser blade, and it took a considerable time to separate the support glass substrate.

INDUSTRIAL APPLICABILITY

The thin plate glass laminate obtained by the present invention is useful for handling a glass substrate for a display device in a process of producing various types of display devices such as LCDs or OLEDs. Further, the process for producing display device employing the thin plate glass laminate of the present invention is useful as a process for producing various types of display devices such as LCDs or OLEDs.

The entire disclosure of Japanese Patent Application No. 2006-129282 filed on May 8, 2006 including specification, claims, drawings and summary is incorporated herein by reference in its entirety.

What is claimed is:

1. A process for producing a display device employing a thin plate glass substrate, the process comprising:
   (a) forming, on a support glass substrate having at least one hole, a silicone resin layer with a silicone resin which is releasable and non-adhesive and having at least one hole that communicates with the hole of the support glass substrate;
   (b) laminating the thin plate glass substrate on a surface of the releasable and non-adhesive silicone resin layer formed on the support glass substrate by a force resulting only from Van der Waals force;
   (c) carrying out a treatment for producing a display device on the thin plate glass substrate; and
   (d) injecting a compressed gas into an interface between the silicone resin layer and the thin plate glass substrate through the hole of the support glass substrate to separate the thin plate glass substrate and the support glass substrate.

2. The process of claim 1, wherein the silicone resin layer is a layer comprising a cured product of a release paper silicone.

3. The process of claim 2, wherein the cured product is a crosslinked product of a linear polyorganosiloxane comprising vinyl groups at both ends or at both ends and in its side chains, and a methyl hydrogen polysiloxane.

4. The process of claim 1, wherein the forming (a) is carried out by applying a release paper silicone on the support glass substrate and curing the release paper silicone.

5. The process of claim 4, wherein the release paper silicone comprises a linear polyorganosiloxane comprising vinyl groups at both ends or at both ends and in its side chains, a methyl hydrogen polysiloxane, and a platinum catalyst.

6. The process of claim 4, wherein the release paper silicone comprises no non-reactive silicone.

7. The process of claim 4, wherein an application of the release paper silicone is carried out by a method comprising screen printing.

8. The process of claim 4, wherein a heat-curing of the release paper silicone is carried out at a temperature of from 50 to 250° C. after the silicone is applied.

9. The process of claim 4, wherein laminating (b) is carried out by vacuum pressing or vacuum lamination.

10. The method of claim 1, wherein the thin plate glass substrate has a thickness less than 0.3 mm.

11. The method of claim 10, wherein the thin plate glass substrate has a thickness of at least 0.1 mm.

12. The method of claim 1, wherein the thin plate glass substrate has a thickness of at most 0.2 mm.

* * * * *